US005457682A

United States Patent [19]
Haag et al.

[11] Patent Number: 5,457,682
[45] Date of Patent: Oct. 10, 1995

[54] APPARATUS AND METHOD FOR SUPPORTING A LINE GROUP APPARATUS REMOTE FROM A LINE UNIT

[75] Inventors: Kenneth W. Haag, Winfield; Shen-Chung Liu, Lisle; Jim D. Peters, Wheaton, all of Ill.

[73] Assignee: AT&T IPM Corp., Coral Gables, Fla.

[21] Appl. No.: 57,361

[22] Filed: May 5, 1993

[51] Int. Cl.⁶ .................................................. H04Q 11/04
[52] U.S. Cl. ........................................ 370/58.2; 370/110.1
[58] Field of Search .................................. 370/58.1–58.3, 370/68.1, 112, 110.1, 84, 60.1, 54, 56; 379/230, 112, 207, 267, 34, 113, 133, 136, 137, 333, 334, 60

[56] References Cited

U.S. PATENT DOCUMENTS

| | | | |
|---|---|---|---|
| 4,007,339 | 2/1977 | Joel | 379/333 |
| 4,197,427 | 4/1980 | Hutcheson et al. | 379/133 |
| 4,546,468 | 10/1985 | Christmas et al. | 370/54 |
| 4,550,404 | 10/1985 | Chodrow et al. | 370/110.1 |
| 4,575,839 | 3/1986 | Ogata et al. | 379/34 |
| 4,654,845 | 3/1987 | Mukerji | 370/58.2 |
| 4,730,304 | 3/1988 | Mezera et al. | 370/58.2 |
| 4,933,934 | 6/1990 | Aikoh et al. | 370/112 |
| 5,086,461 | 2/1992 | Thorn et al. | 379/230 |
| 5,119,366 | 6/1992 | Ardon et al. | 370/54 |

*Primary Examiner*—Melvin Marcelo
*Assistant Examiner*—Chau T. Nguyen
*Attorney, Agent, or Firm*—Charles L. Warren

[57] ABSTRACT

In order to extend the geographical coverage of a line unit utilized in a telecommunications system, a host line apparatus is utilized in place of a conventional line group apparatus in a line unit. The host unit communicates information directed to the line group apparatus which it replaces via a transmission media to a remote line group unit which is geographically separated from the line unit. The remote line group supports a plurality of individual subscriber lines and provides service to the subscribers without requiring many of the elements normally required in a normal common shelf utilized in a conventional line unit.

13 Claims, 12 Drawing Sheets

FACILITY FORMAT

CONTROL CELL

FIG. 9
HOST FLAG REGISTERS

|  | BIT 7 | BIT 6 | BIT 5 | BIT 4 | BIT 3 | BIT 2 | BIT 1 | BIT 0 |
|---|---|---|---|---|---|---|---|---|
| 250 — DATA | RCV_DA | X | X | X | X | X | X | X |
| 252 — HPROT | P_RES | QUERY | RCV_SER | SER_MSG | QU_ACK | P_RESAC | D_ACK | X |
| 254 — FACALM | HSAI | RSAI | X | X | X | X | X | X |
| 256 — CEL_ERR | CEL_CRC | X | X | X | X | X | X | X |

FIG. 10
REMOTE FLAG REGISTERS

|  | BIT 7 | BIT 6 | BIT 5 | BIT 4 | BIT 3 | BIT 2 | BIT 1 | BIT 0 |
|---|---|---|---|---|---|---|---|---|
| 260 — RPROT | D_ACK | QUERY | QU_ACK | SER_MSG | RCV_SER | P_RES | P_RESAC | X |
| 262 — DATA | RCV_DA | FW_DA | RTN_DA | LB_ER | LC_ER | HS_ASW | HS_PAR | XPT_ER |
| 264 — FAULT | X | X | X | HTS_PA | LTS_PA | PLL_SL | SIT_ALM | SAI |
| 266 — CEL_ERR | CEL_CRC | X | X | X | X | X | X | X |

REMOTE LINE GROUP INTERFACE – REMOTE BASE LEVEL CYCLE

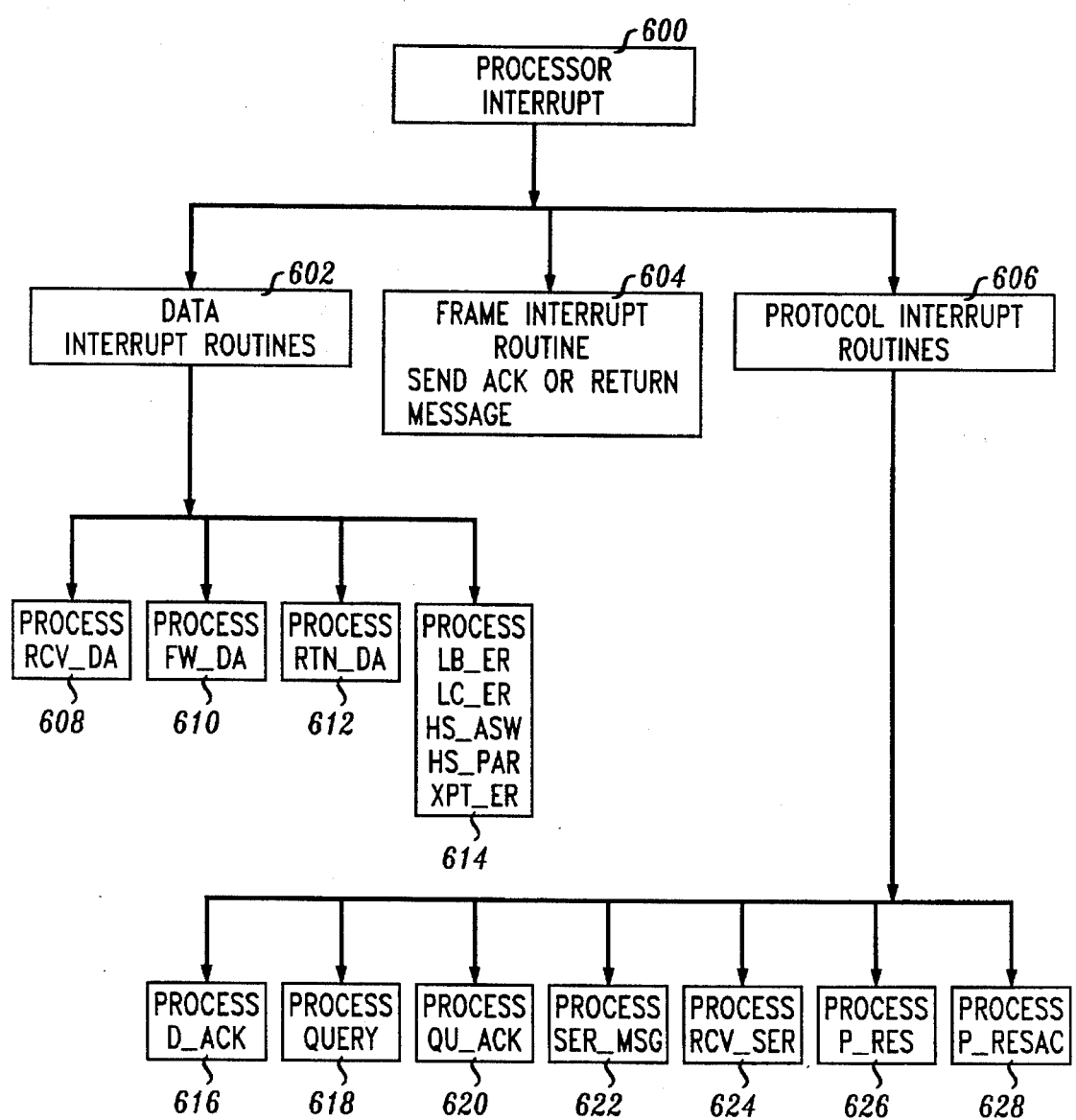

APPARATUS AND METHOD FOR SUPPORTING A LINE GROUP APPARATUS REMOTE FROM A LINE UNIT

BACKGROUND OF THE INVENTION

This invention is generally directed to telecommunication switching systems and is more specifically directed to line units associated with such systems which connect individual subscriber lines to the telecommunications system.

Telecommunications systems such as those that support the public switched telephone network employ central office systems which function as switching centers for a group of subscribers. A switching center may consist of an AT&T 5ESS® switch as shown in FIG. 1. It includes an administration module 20 which provides operation, administration and maintenance services for the switch. A communication module 22 links communication channels, i.e. different time slots which carry subscriber communications, from the switching modules. A switch module 24 switches time slots through the known time-space-time switching fabric to connect subscribers. The switching module 24 supports local line units 26 and remote line units 28 which are coupled to the switching module 24 by a communication facility 30. The function of line units 26 and 28 are to provide individual line interfaces with telephone lines coupled to customer premises equipment (CPE) 32 such as conventional telephone sets. Because of restrictions associated with the transmission of signals, line unit 26 must be located within a predetermined distance of switching module 24. The remote line unit 28 can be located farther from switching module 24 than the maximum distance permitted for a local line unit 26 by the use of a transmission facility 30 which may comprise known transmission equipment designed to transmit and receive signals over a specified transmission media. Distances between the CPE 32 and the corresponding line unit 26 or remote line unit 28 have similar maximum limits. Thus, location restrictions exist on where line units can be located relative to groups of subscribers to be served by the line unit.

A remote switching module 34 can be located beyond the maximum distance which the switching module 24 can be located relative to communications module 22 by the use of a transmission facility 36. The remote switching module 34 may support a plurality of line units, such as including line unit 38, which in turn supports CPE 32.

The location of subscribers and corresponding CPE 32 dictate the basic design requirements for a central office switch system in that either line units or remote line units must be located within the maximum distance range supported by these units. While it is possible to locate a plurality of switching modules 24 and remote switching modules 34 in a configuration relative to a centrally located communications module 22, it is desirable to minimize the number of switching modules rather than utilize "optional" switching modules in order to satisfy geographic subscriber locations in view of the costs of the switching modules. Thus, it is desirable to maximize the number of subscribers served by each switching module. This consideration requires that line units and remote line units be utilized to serve as many subscribers as possible considering the geographic and other loading considerations. A remote line unit 28 basically consists of the same components as utilized for a local line unit 26 plus additional interface capabilities to accommodate the transmission facility 30.

FIG. 2 illustrates a conventional line unit 40 which is coupled by a communication channel 42 to a switching module. The line unit includes a common shelf 44 which serves each of line group apparatus 1 through line group apparatus 16. Each of the line group apparatus is capable of connecting a plurality of subscriber lines and in the illustrative example, each line group apparatus can support up to 64 subscriber lines. Thus, each line unit 40 can support a maximum of 1028 subscriber lines. The purpose of the common shelf elements is to provide an interface to the switching module and to generate commands to control the transmission of data between a subscriber line associated with a given line group apparatus and the connected switching module.

The common shelf 44 includes a CC module 46 which includes a common control processor and a common control interface module. The CC module distributes control orders to the other elements on the common shelf and to each of the two group apparatus. A common data (CD) module 48 includes common data packs. The CD module provides the data interface path between the line group apparatus and the switching module. A high level service circuit (HLSC) 50 provides line testing, diagnostic measurements, and back-up ringing capabilities. A ring generator (RG) 52 is utilized to provide a ting signal generation capability that can be switched to any of the connected subscriber lines to thereby provide a ringing signal to the coupled CPE. A metallic access network (MAN) 54 is utilized to provide a metallic path to selected line group apparatus in order to provide paths for testing diagnostic, and ringing. Such line units and conventional line group apparatus are known in the art. It is also known that duplicate sets of the above described common shelf elements are utilized in order to provide increased reliability through redundancy so that one set can be utilized should a failure occur in the other like set of elements. It will be apparent that each of the sets of elements must have the capability of communicating with each of the line group apparatus in order to remain functional in the event of a failure to one set of elements in the common shelf. Each line group apparatus consists of a series of up to 8 line boards; each line board is capable of supporting (terminating) eight subscriber lines so that each line group apparatus can support up to 64 subscriber lines. Line boards of this type are generally known in the art.

As seen in FIG. 1 it is possible to place a remote line unit 28 further from a switching module 24 than a local line unit 26. However, each remote line unit consists of all of the elements in a local line unit plus additional interface modules to interface with the transmission facility 30. Thus, it is expensive to use a remote line unit to support a relatively small group of subscribers. Thus, there exists a need for a more flexible and cost effective means for supporting geographically dispersed subscribers.

SUMMARY OF THE INVENTION

It is an object of the present invention to provide an improved line unit, and a corresponding method, which permits line group apparatus associated with the line unit to be remotely located relative to the line unit.

It is a further object of the present invention to provide such an improved line unit wherein common shelf elements are minimized relative to the support of the remote line group apparatus, thereby maximizing the economies of providing remote subscriber services.

In accordance with an embodiment of the present invention, a line group apparatus (LGA) 1 is suited for location remote to a host line apparatus (HLA) which is linked by a communication channel to the LGA 1. The HLA provides an interface between the LGA 1 and a switching module of a telecommunication switching system. The LGA 1 accepts circuit boards that provide terminations for individual subscriber lines. The LGA 1 includes a mechanism for storing first commands associated with the control of call parameters of subscriber lines. The first commands are generated and sent from circuit boards which terminate the respective subscriber lines of the LGA 1. A mechanism is provided for translating the first commands into second commands. The second commands are transmitted to the HLA which is located geographically remote from the LGA 1. A mechanism is provided for receiving and storing third commands directed to the control of call parameters of communication lines associated with the LGA 1. The third commands are sent from the HLA to the LGA 1. A mechanism is provided for translating the third commands into fourth commands. The fourth commands are transmitted to circuit boards associated with the LGA 1. A mechanism is provided for transmitting user data to the HLA and for receiving user data from the HLA. The LGA 1 thus enables a group of subscribers at a location remote from the HLA to be economically connected and served.

In accordance with the present invention, one or more of the line group apparatus associated with a line unit can be remotely located from the normally associated line unit and, hence allows subscribers located beyond the maximum normal line unit support distance to be served. Preferably, this remote subscriber support includes a host line apparatus module which functions as a local normal line group unit in terms of interaction with a common shelf element of the line unit. The host line apparatus is connected by a transmission facility to a remotely located local group apparatus (LGA 1 ) which includes complementary interfaces to the HLA transmission facility and permits subscriber line boards to be supported without requiting the normal common shelf elements to be present at the remote LGA 1. This permits the remote LGA 1's to provide a more economical support for groups of remotely located subscribers, especially where diverse sets of small groups of such subscribers must be served.

BRIEF DESCRIPTION OF THE DRAWING'S

FIG. 9 illustrates the use of flags to indicate conditions of four host flag registers.

FIG. 10 illustrates the use of flags to indicate conditions of four remote flag registers.

FIG. 14 is a flow diagram of interrupt processes utilized in conjunction with the steps of FIG. 13 to control the operation of the remote line group apparatus.

DETAILED DESCRIPTION

In order to provide an economic solution to the servicing of geographically separated small groups of subscribers, an embodiment of the present invention will be described which permits a line unit to support a line group apparatus located geographically remote from the line unit itself. This permits a plurality of such remotely located line group apparatus to be each located at geographically separated small groups of subscribers with each of the line group apparatus being supported by a single line unit. The preferred embodiment of the present invention enhances such an economical solution by eliminating the need for a complete set of normally utilized common shelf elements at the remote line group apparatus, thereby permitting the latter to be economically deployed.

Figure 3:
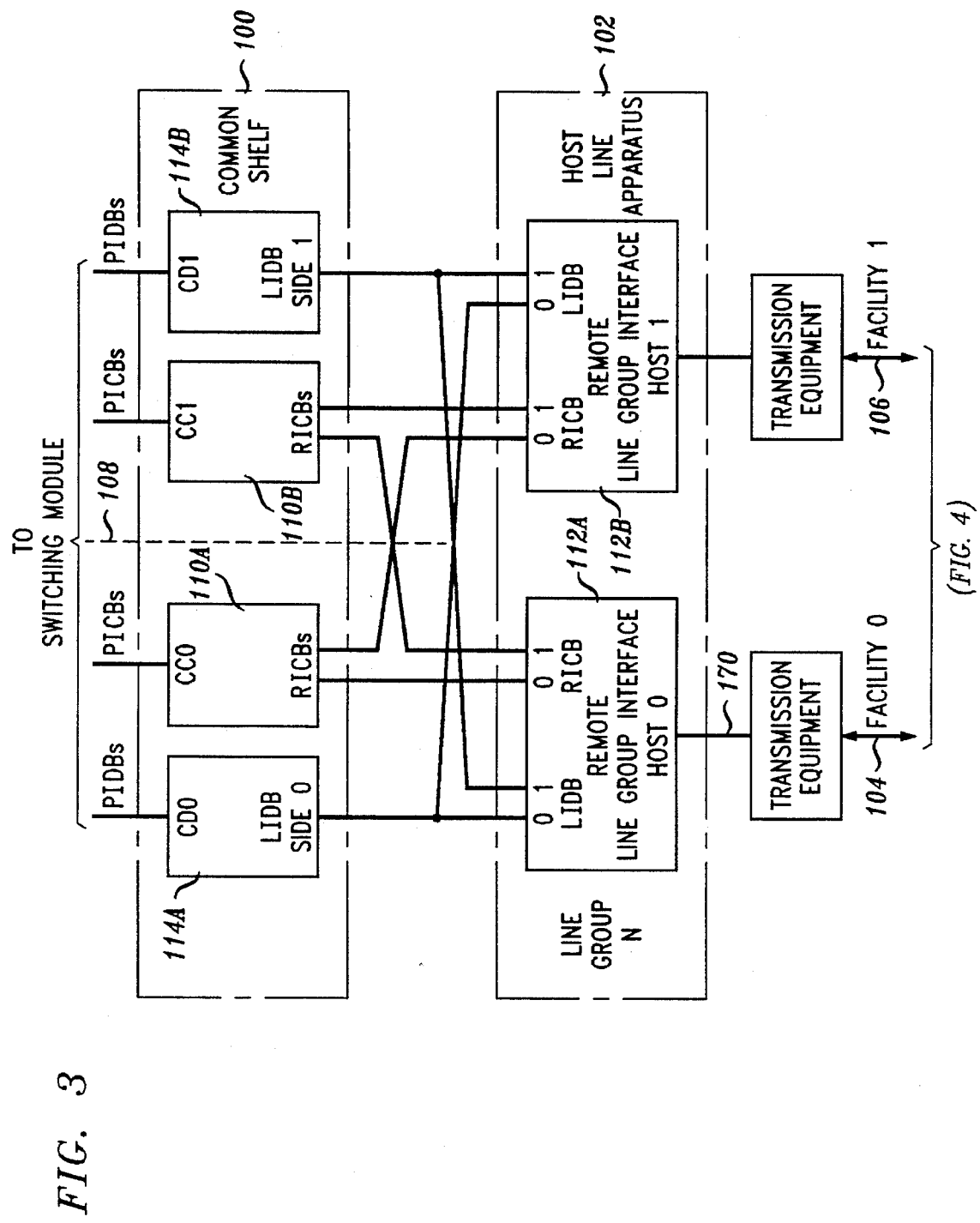
FIG. 3 is a block diagram of a line unit in accordance with an embodiment of the present invention which includes a host line apparatus module which is utilized in place of a line group module.
Figure 4:
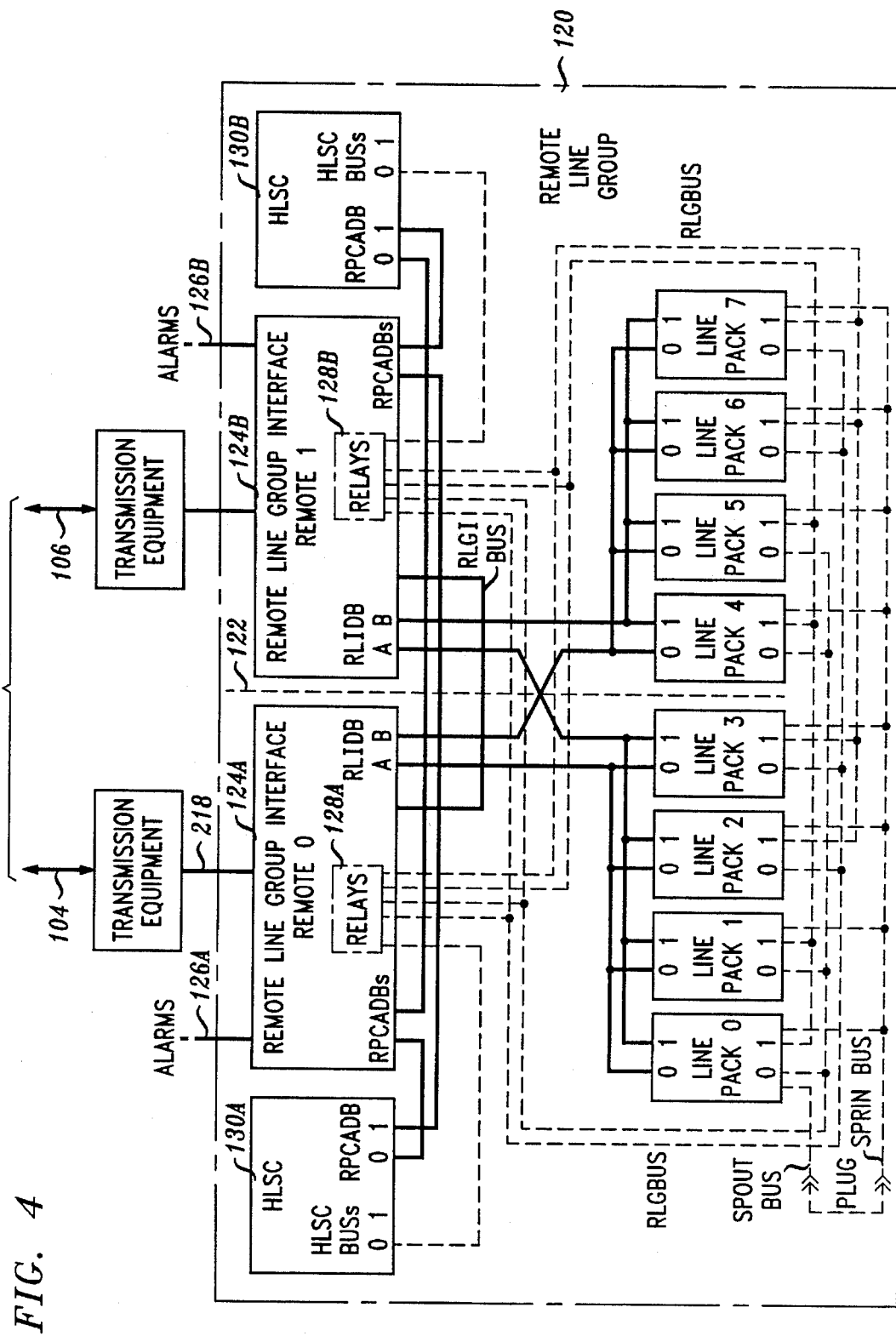
FIG. 4 illustrates a block diagram of a remote line group module in accordance with an embodiment of the present invention which communicates with the host line apparatus as shown in FIG. 3.

FIG. 3 illustrates a line unit in accordance with the present invention which supports an embodiment of a remote line group as shown in FIG. 4. Common shelf 100 contains in addition to the elements illustrated, the other elements described in association with the description of common shelf 44. Common shelf 100 provides an interface between subscriber data and commands communicated between the associated switching module and host line apparatus 102 that replaces a conventional known line group apparatus. Transmission facilities 104 and 106 include a transmission media linking host line apparatus 102 with the remote line group shown in FIG. 3 and includes conventional transmission equipment located at each end of the transmission facility. The elements not illustrated in common shelf 100 which comprise known modules and known line group apparatus will not be described since these elements are known such as available from AT&T.

The dashed line 108 divides the elements in common shelf 100 into mirror image halves which function in substantially identical manner and provides a back-up capability should a failure occur in one of the halves. Common control (CC) modules 110-A and 110-B provide communications with the connected switching module by asynchronous peripheral interface control bus (PICB). Command and control information are carried by the PICB's communication lines. The CC modules 110-A and 110-B each utilize a remote interface control bus (RICB) to communicate with remote line group interfaces 112-A and 112-B contained in the host line apparatus 102. Thus, commands and controls can be communicated in each direction between the transmission facilities 104 and 106, the common shelf 100 and the connected switching module.

A peripheral interface data bus (PIDB) provides channels for carrying subscriber communications between the switching module and common data (CD) modules 114-A and 114-B of the common shelf 100. Information carried by the PIDB consists of time slots, i.e. time multiplexed channels, which carry subscriber data such as in the typical pulse code modulation (PCM) format utilized in telecommunications systems. Each of the CD modules 114-A and 114-B are connected by a line interface data bus (LIDB) with the remote line group interfaces 112-A and 112-B, respectively. Thus, the transmission facilities 104 and 106 are each capable of transmitting and receiving subscriber communications by the host line apparatus 102 and common shelf 100 to the connected switching module utilizing the LIDB and PIDB buses. Since the CC and CD modules are generally known and are available from AT&T, these modules will not be described in further detail. A detailed description of the remote line group interfaces 112-A and 112-B will be described in conjunction with FIG. 5. It will be understood that the cross-coupled connections illustrated in FIG. 3 between common shelf 100 and host line apparatus 102 provide the known capability of permitting the mirror image elements in common shelf 100 to selectively communicate with either of the remote line group interfaces 112-A or 112-B to provide improved reliability and to provide alternative back-up capability, should one of the sets of elements fail.

FIG. 4 illustrates an embodiment of a remote line group apparatus 120 which is coupled by transmission facilities 104 and 106 to the host line apparatus 102 as shown in FIG. 3. It will be apparent that the element shown in remote line group apparatus 120 is asymmetrical about dashed line 122 in order to permit either of the halves to communicate with the two sets of line packs, i.e. line pack 0–3 and line pack 4–7. Remote line group interface modules 124-A and 124-B are coupled to transmission facilities 104 and 106, respectively. As will be explained in more detail below, interface modules 124-A and 124-B communicate both command and subscriber data between the transmission facilities and the line packs which are coupled to subscriber lines. Lines 126-A and 126-B couple external alarm sensors to the interface modules 124-A and 124-B, respectively, in order to provide alarm sensing and the transmission of alarm signals to the host line apparatus 102. A matrix of relays 128-A and 128-B provide interface modules 124-A and 124-B, respectively, with the capability of selectively connecting individual subscriber lines with HLSC module 130-A and 130-B, respectively. Each of modules 130-A and 130-B are capable of generating ringing voltage which can be supplied by the HLSC bus through the relay matrix to an individual subscriber line. Remote peripheral control and data bus (RPCADB) couples module 124-A and 124-B to each of the HLSC modules 130-A and 130-B. This bus interconnection allows either interface module to be able to provide command signals to control ring generation by the HLSC modules. Each remote interface module includes a set of two remote line interface data buses (RLIDB). Each of these two buses A and B are coupled to line pack 0–3 and line pack 4–7, respectively. These buses provide a transmission path for communication of PCM data and associated line pack orders between the remote interface modules 124-A and 124-B. Remote line group buses couple the relay matrix 128-A and 128-B to the respective line packs in order to provide ringing voltage to corresponding connected subscriber lines to provide the traditional ringing indication of an incoming call to subscribers. A remote line group interface (RLGI) bus interconnects remote interface modules 124-A and 124-B in order to establish common timing and control signal passage between the interface modules.

Figure 1:
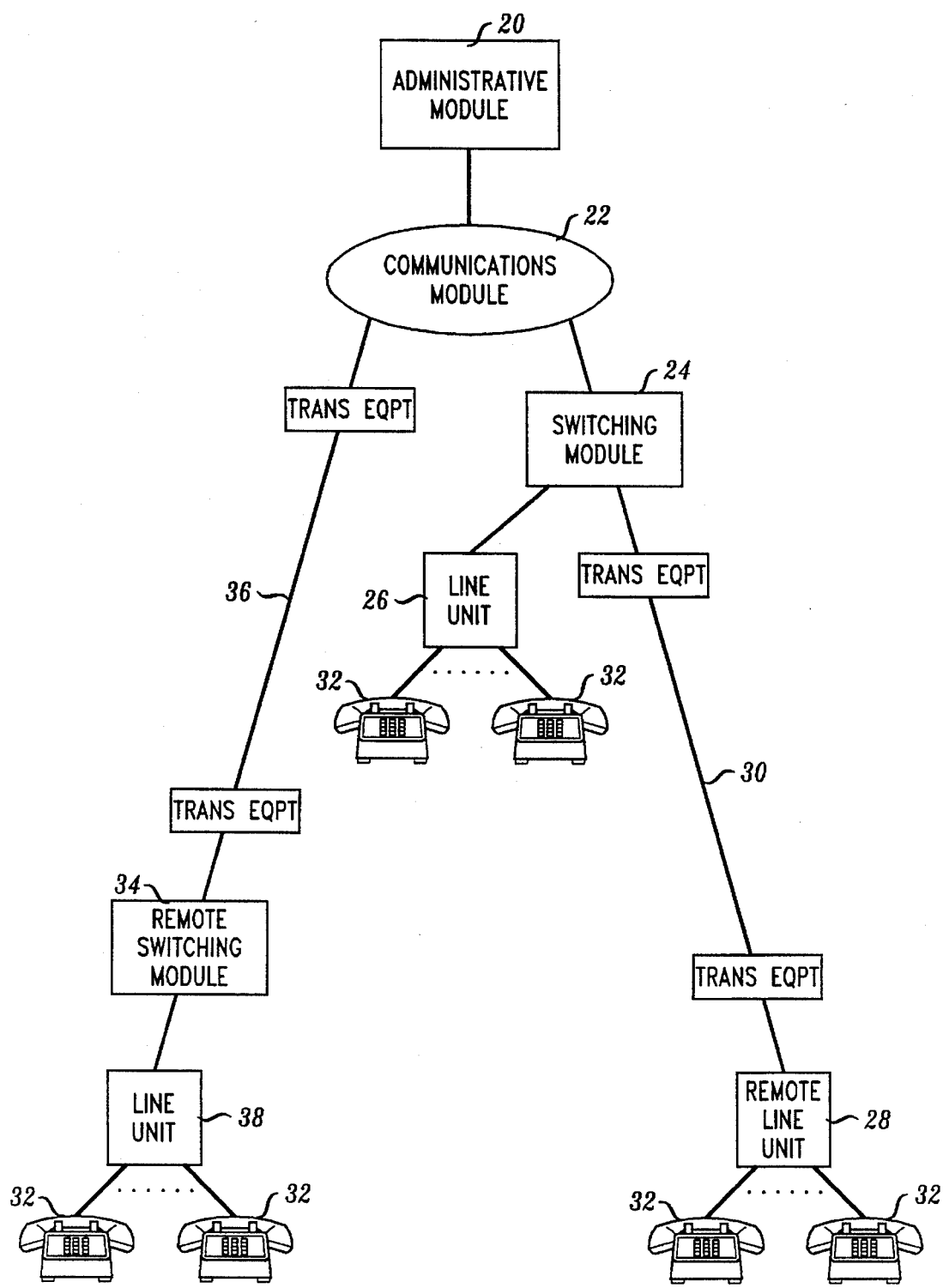
FIG. 1 is a block diagram of a telecommunications system as known in the prior art.
Figure 2:
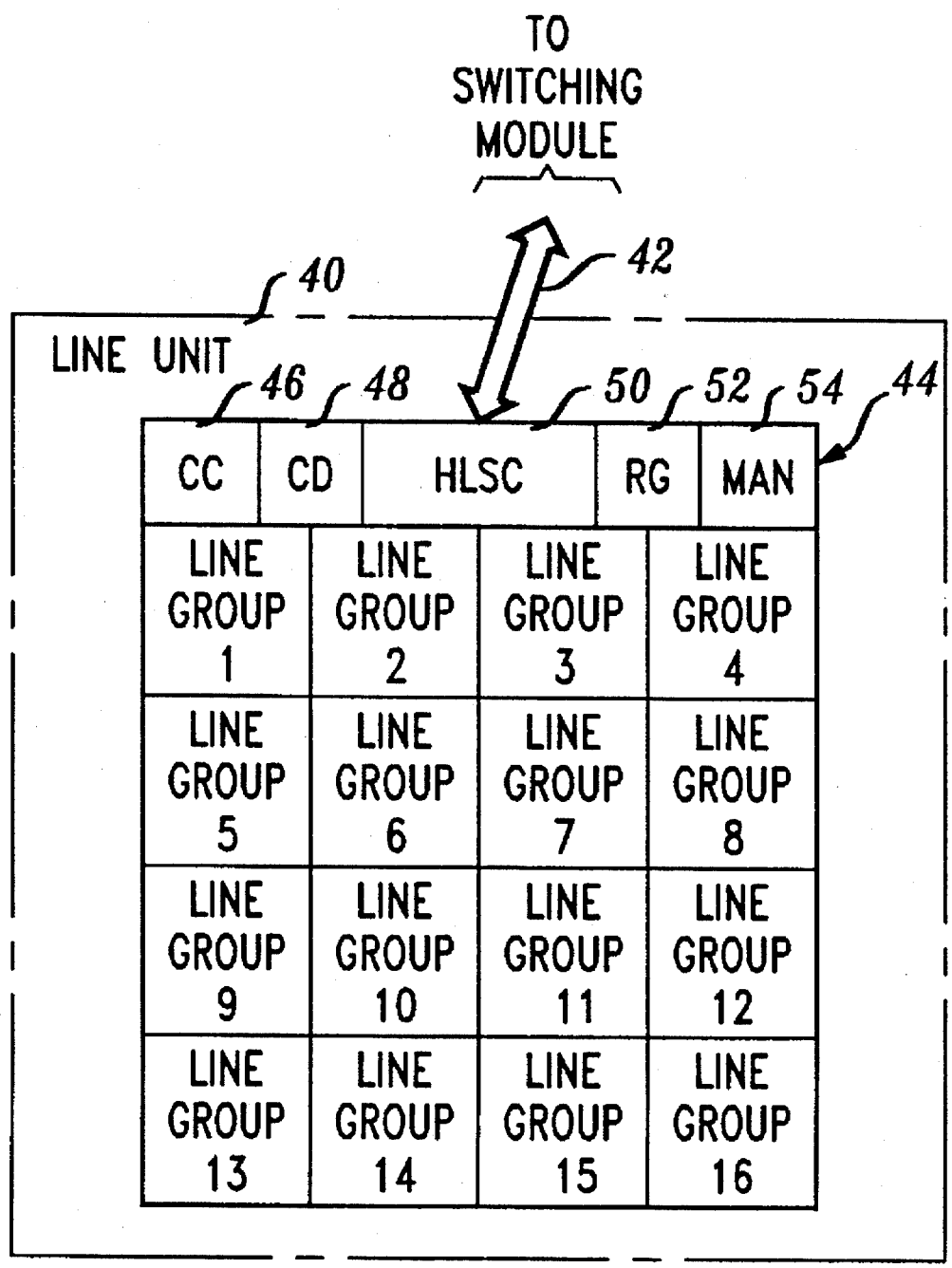
FIG. 2 is a block diagram of a line unit as referenced in FIG. 1 which is known in the prior art.

The line packs as utilized in the remote line group apparatus 120 are the same line packs suited for utilization in known line group apparatus of a known line unit 40 as shown in FIG. 2. Thus, commonly known line packs can be utilized in accordance with the present invention with the remote line group apparatus 120 as well as with common line groups supported by line unit 140. Similarly, the HLSC modules 130-A and 130-B utilized in remote line group apparatus 120 are also identical to the same modules utilized in the common shelf 44 of line unit 40. Therefore, these modules further enhance the economies associated with the present invention in that special additional modules need not be utilized. For example, line packs may comprise line packs and HLSC modules available from AT&T.

Figure 5:
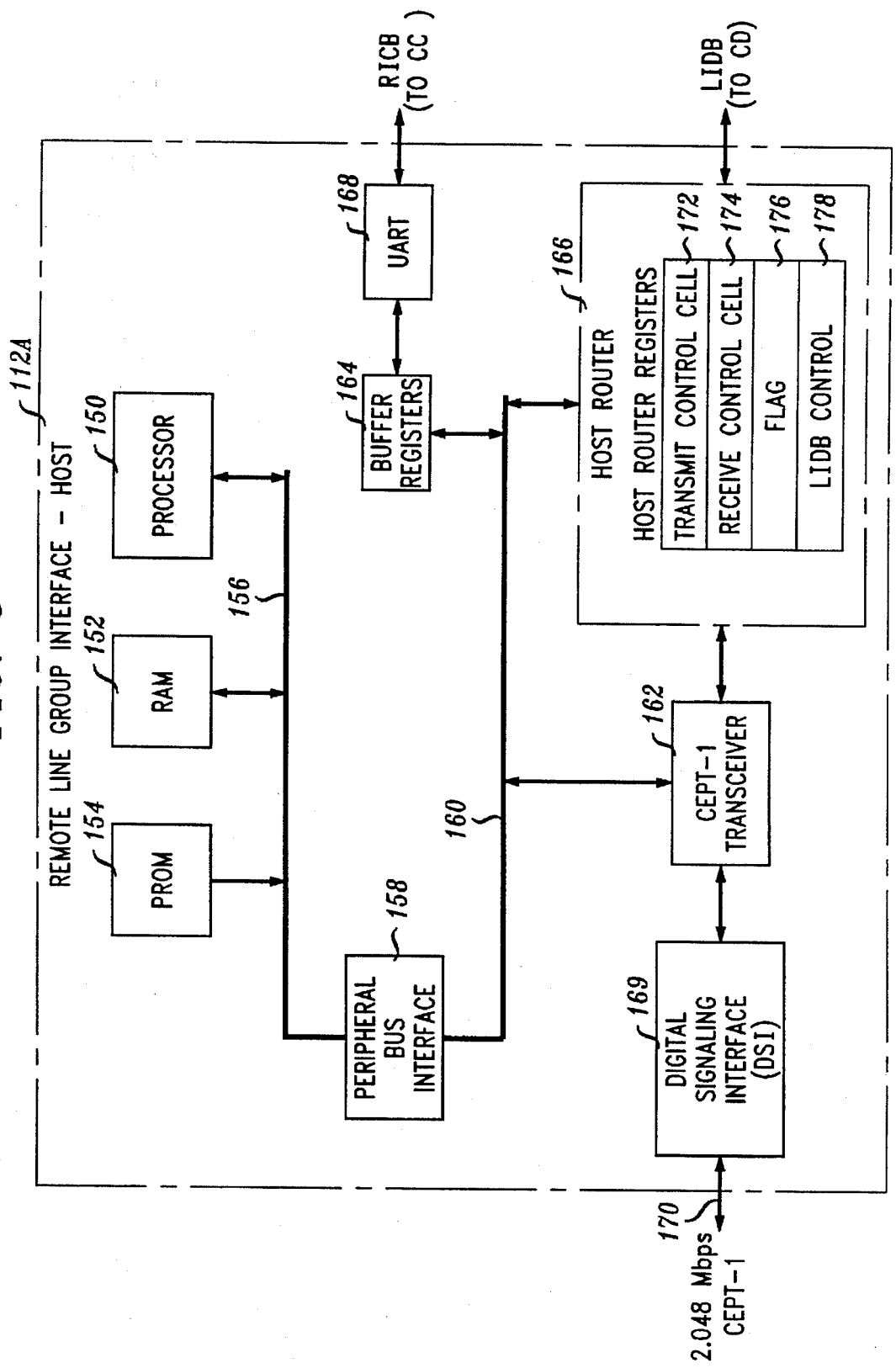
FIG. 5 is a block diagram of a remote line group interface as utilized by the host line apparatus as illustrated in FIG. 3.

FIG. 5 illustrates in more detail the remote line group interface 112-A as utilized in the host line apparatus 102 as shown in FIG. 3. The remote line group interface 112-A includes a processor 150 such as an 8-bit microprocessor, random access memory (RAM) 152 and programmable read only memory (PROM) 154 coupled to processor 150 via bus 156. A peripheral bus interface 158 interfaces bus 156 with a bus 160 which is coupled to CEPT-1 transceiver 162, buffer registers 164 and host router 166. Buffer registers 164 and a universal asynchronous receiver transmitter (UART) 168 provide an interface between the serial data transmitted on the remote interface control bus (RICB) of the common control module 110-A and bus 160. The host router 166 is coupled to the line interface data bus (LIDB) of the common data module 114-A. The router adds a cyclic redundancy code (CRC) to control information which is supplied over the RICB and multiplexes it with the LIDB PCM data received from the LIDB bus to produce the data stream towards transceiver 162 (downstream data). With regard to data received from transceiver 162, router 166 checks the control cell, as will be described later, for proper CRC and protocol. The control cell is then transmitted to processor 150 for further interpretation and handling. The entire data stream which is received from the transceiver 162 is supplied to the LIDB. A digital signaling interface (DSI) 169 provides an interface between transceiver 162 and a preferred 2.048 Mbps CEPT-1 bus 170 which is coupled to the transmission equipment associated with transmission facility 104 as shown in FIG. 3.

The host router 166 includes registers 172, 174, 176 and 178 which correspond with transmit control cell, receive control cell, flags, and LIDB control information, respectively. The information controlled in these registers will be described in more detail below.

The DSI 169 may comprise a known module which performs line encoding and decoding to CCITT standards such as model T7288 available from AT&T. The CEPT-1 transceiver 162 provides a transmission rate conversion, formats framing and signaling time slots for transmission, recovers framing on reception, and provides maintenance information as defined by CCITT standards G.703, G.704, and G.732. The CEPT-1 transceiver 162 may comprise model 229HN available from AT&T.

The host router 166 contains a plurality of host router registers which are utilized to accumulate related information typically in preparation for its transmission or in preparation for reading the information and acting upon it. The transmit control cell register 172 is loaded by processor 150 when there is a message for the downstream, i.e. remote line group apparatus 120. The host router automatically loads this register with an idle cell message immediately after the transmission of a cell and, unless overwritten by processor 150, the idle cell is transmitted in the succeeding frame.

Received control cell register 174 contains the control cell which is received during each frame. Processor 150 reads the register to obtain the receive information and response to a data interrupt or a protocol interrupt.

Flag register 176 contains bits which inform processor 150 of the type of message contained in the received control cell register 174. Based upon the given type of message, the processor 115 jumps to the proper routine and immediately begins processing the message. The LIDB control register 178 contains bits which tell the host router which LIDB it should listen to for downstream PCM data and which LIDB it should use for transmitting its upstream PCM data.

Figure 6:
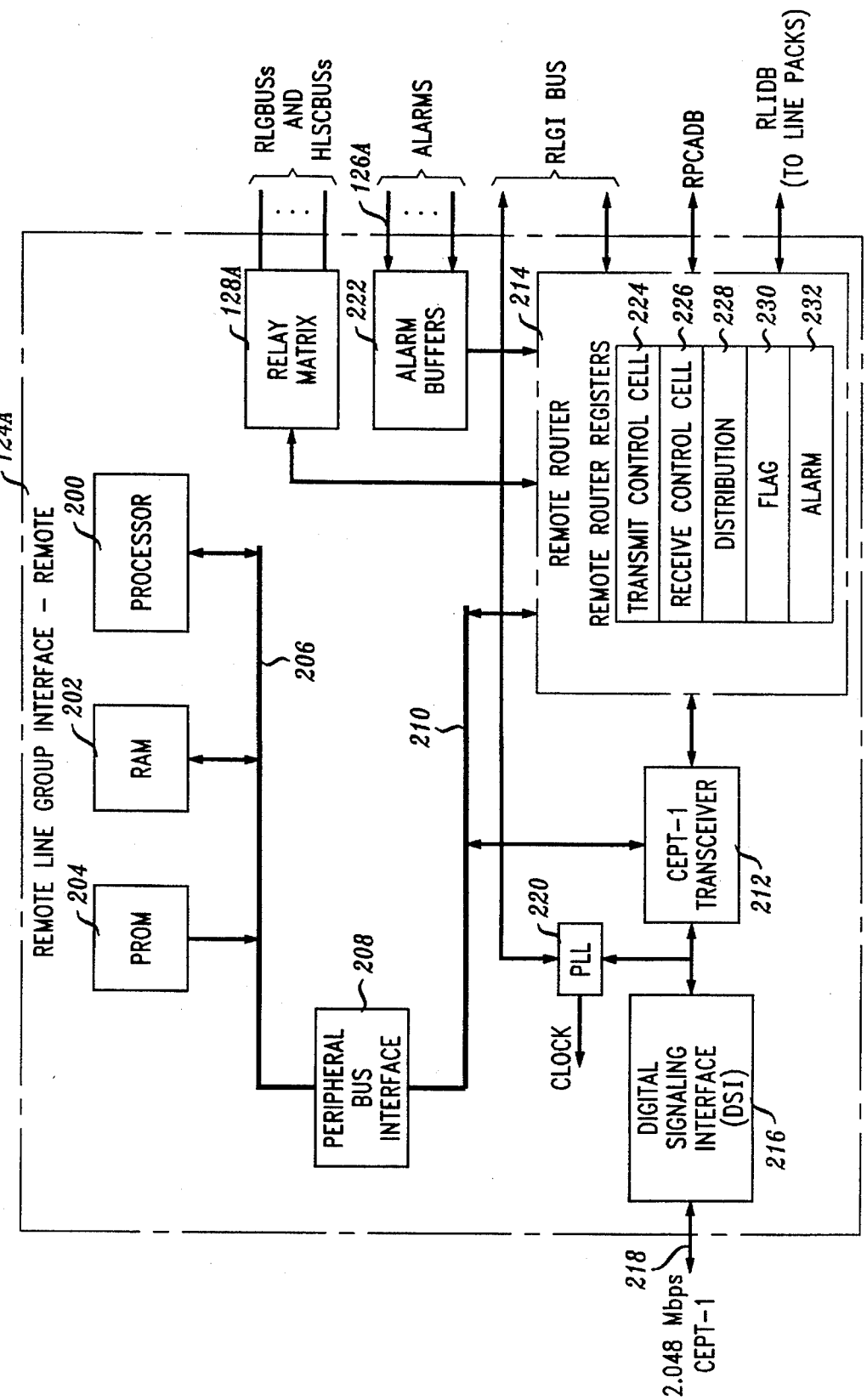
FIG. 6 is a block diagram of a remote line group interface as utilized in the remote fine group as illustrated in FIG. 4.

FIG. 6 illustrates the remote line group interface module 124-A of FIG. 4 in greater detail. This interface module 124-A operates under the control of a microprocessor system which includes processor 200, RAM 202, and PROM 204 coupled by bus 206. A peripheral bus interface 208 provides interface between bus 206 and bus 210 which, for example, may operate at a clock rate less than bus 206. Bus 210 is connected to CEPT-1 transceiver 212 and remote router 214. A digital signaling interface (DSI) 216 is coupled to a 2.048 Mbps CEPT-1 communication channel 218 which is, in turn, coupled to the transmission facility 104. A phase locked loop (PLL) 220 drives the local clock from communications transmitted between DSI 216 and transceiver 212. Generally, elements 216 and 212 perform similar functions for interface 124-A as did corresponding elements 169 and 162 in interface module 112-A. The relay matrix 128-A as previously discussed with regard to FIG. 4 is connected by RLG buses to the subscriber lines associated with the different line packs and by HLSC buses to the HLSC modules 130-A. Lines 126-A from various alarm sensors are coupled to alarm buffers 222; the alarm buffer data is coupled to remote router 214 for subsequent transmission by the transmission facility 104 to the host line apparatus 102. The remote router 214 contains registers 224, 226, 228, 230, and 232 which correspond to data related to transmit control cell, receive control cell, distribution, flag, and alarm functions, respectively. The remote router 214 provides an interface between the transmission facility data stream and the remote line interface data bus (RLIDB), the remote peripheral control and data bus (RPCADB), bus 210, relay matrix 128-A, and the remote line group interface (RLGI) bus. In the downstream direction, i.e. flow of information from the host line apparatus 102 to the remote line group apparatus 120, remote router 214 checks the receive control cell for correct CRC and protocol. The remote router determines the destination of the control cell order and distributes it accordingly, i.e. RLIDB for line packs, RPCADB for HLSC, relay registers, or to the processor 200 if the order (command) is intended for microprocessor control. In the return direction from the peripherals, the remote router checks parity of the control and PCM time slots on the RLIDB, check parity and the all-seems-well (ASW) signal on the PCADB, checks parity of the RLGI bus, monitors the alarm buffers, and reports any noted failures to processor 200. The processor 200 formulates the control cell from information provided by the remote router and loads this information in a remote router transmit register. The remote router multiplexes the transmit register data into the upstream RLIDB PCM data stream to form the upstream facility data stream.

Remote router 214 includes a plurality of remote router registers utilized to collect information for later transmission or reading in preparation for an action by processor 200. Transmit control cell register 224 is loaded by processor 200 when there is a message to be transmitted from remote line group apparatus 120 to host line apparatus 102. This register is loaded with an idle cell immediately after the transmission of a cell and unless overwritten by processor 200, the idle cell is transmitted in the succeeding frame.

Receive control cell register 226 contains the control cell which was received during each frame. Processor 200 reads this register to obtain the received information in response to either a data interrupt when the received data or firmware data bits are set in the flag register or a protocol interrupt.

The distribution register contains the return information from any line pack, HLSC or relay matrix operations. This register is read by processor 200 in response to a data interrupt when the return data bit is set in the flag register.

Flag register 230 contains bits which inform processor 200 of the type of message contained in the receive register or the distribution register. It is more efficient to interpret message type in a hardware implementation of the remote router than by processor 200. The message type having been determined, the processor 200 jumps to the proper routine and immediately begins processing the appropriate message.

Alarm register 232 contains the state of the site Alarm signals. The register is read during the processor 200 base level cycle routine.

Figure 7:
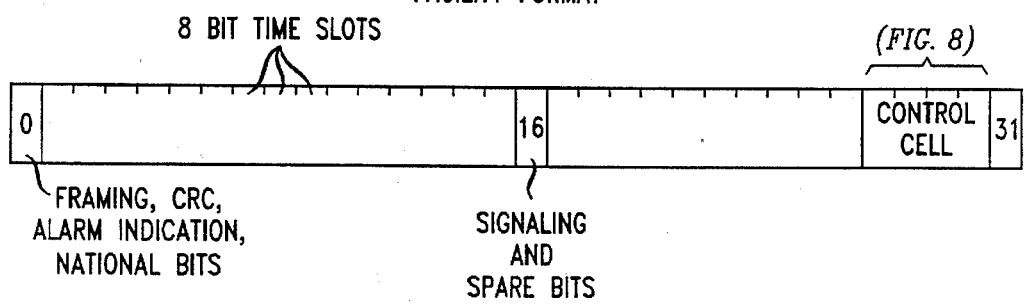
FIG. 7 illustrates the transmission format illustrating frames of information transmitted between the host and remote line group units.

FIG. 7 illustrates the information transmission format for one frame of information transmitted between the host line apparatus and the remote line group. Each frame consists of 32 time slots each representing eight bits of binary information. The utilized format is in compliance with the CCITT format definition contained in CCITT Section G.703. In this format, time slots zero and 16 are assigned to carry predetermined information. More specifically, the zero time slot contains framing CRC, alarm indication, and national bit indication information; the sixteenth time slot contains signaling and spare bit information consistent with the identified CCITT protocol. The four consecutive time slots identified as the control cell, i.e. time slots 27, 28, 29, and 30, are utilized in accordance with the present invention to carry control information utilized by the apparatus of the present invention. Thus, time slots 1–15, 17–26, and 31 are available to carry data such as subscriber conversation information consisting of PCM data.

Figure 8:
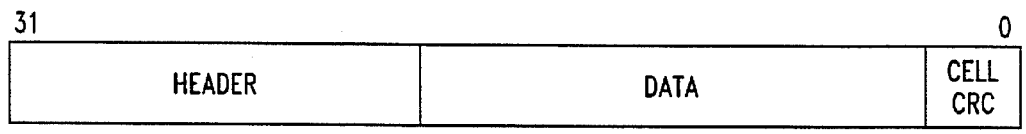
FIG. 8 illustrates the format of information contained in the control cell portion as illustrated in FIG. 7.

FIG. 8 illustrates the format utilized by the control cell as illustrated in FIG. 7. Each control cell which is transmitted with each frame in the preferred embodiment consists of 32 bits comprising a header section, a data or message section, and a cell CRC value. For downstream communications, i.e. communications sent from host line apparatus 102 of FIG. 3 to remote line group 120 of FIG. 4, the control cell header includes a specific device address and an assigned control cell number. Three types of downstream control cells exist which affect the assigned number. Idle and protocol type control cells each have a predetermined assigned number utilized in the control cell header; incremented sequential numbers identify data control cells which carry a message in the data portion of the control cell. The sequential assigned number for data type control cells are utilized to assure that messages arrive in the proper sequence and that messages are not lost in transmission. The device address utilized in the header identifies the peripheral device in the remote line group to which the associated data message is to be delivered. For example, the address could indicate HLSC 130-A, one of the line packs, or remote line group interface module 124-A. The header also contains an acknowledgement designator which indicates the type of acknowledgement to be returned to the host. Acknowledgement designators may indicate the following types of acknowledgements: (a) no acknowledgement; (b) acknowledgement upon successful receipt of control cell; (c) acknowledgement upon successful receipt and upon successful write operation; (d) acknowledgement upon successful receipt and return results of read operation. Thus, the acknowledgement designator can be utilized to request the type of acknowledgement to be returned from the remote to the host. The cell CRC is utilized to establish the validity of the control cell. Host router 166 calculates the CRC and appends the calculated CRC value as the cell CRC. Remote router 214 upon receipt of the control cell independently calculates the CRC and compares the calculated value to the received CRC value. A mismatch of calculated and received CRC values indicates an error in data reception resulting in the cell being discarded and a bit being set as a flag register utilized as an aid in monitoring the capability of the system.

Upstream communications utilizes the same control cell format generally shown in FIG. 8 but transmits different information and utilizes different header information since communications from the remote line group apparatus 120 to the host line apparatus 102 may typically consist of acknowledgements, error messages and fault messages. The upstream header portion of the control cell includes message sequence numbers and final destination address of the message contained in the data portion of the control cell. Control cells sent from the remote to the host likewise are guarded by the transmission of a cell CRC.

FIG. 9 illustrates a set of host flag registers 176 which provide information to processor 150. Registers DATA and HPROT are devoted to bits which describe the contents of the received control cells that contain messages for the host. When a cell containing a message arrives, host router 166 checks validity of CRC, interprets the header, sets the appropriate flag bit, and asserts a data interrupt if a data message is received or a protocol interrupt if it is a protocol message. The type of interrupt directs the processor 150 to the proper flag register. If a received cell does not contain a message which requires operation by the processor, the host router asserts a frame interrupt which does not require action but provides frame synchronization timing for the processor. The remaining host flag registers, FACALM, and CEL__ERR contain information relating to the proper operation of the facility. Processor 150 polls these registers while it is executing its base level cycle. The "X"'s indicated in FIG. 9 indicate that the respective bit is not utilized, i.e. "don't care" conditions exist.

Data register 250 utilizes only one meaningful bit, RCV__DA, which informs the processor that a data message has been received. The host protocol (HPROT) register 252 identifies the type of protocol message which has been received in a unit cell in accordance with the following: P__RES is a protocol reset flag; QUERY is a query flag; RCV__SER, a received sequence error flag, is utilized to indicate that a sequence error has occurred in a received data cell, processor sends a sequence error message to the remote end; SER__MSG corresponds to a sequence error message from the remote end; QU__ACK represents a query acknowledge flag; P__RESAC corresponds to a protocol reset acknowledge flag; and D__ACK indicates a data acknowledge flag.

The facility alarm (FACALM) flag register 254 utilizes bits or flags to notify the processor of facility problems which have been detected. When either of the bits are set, the processor reads the transceiver registers to identify the specific problem and generates a report to the host. The HSAI bit is indicative of a problem in the receive signal at the host; the RSAI bit indicates a problem in the receive signal at the remote. The cell error (CEL__ERR) flag register 256 contains the CEL__CRC bit which, when set, tells the processor that a received control cell contained a CRC error.

FIG. 10 illustrates a set of remote flag registers 230 utilized by remote router 214 to provide information to the processor 200 via the setting of flags in the registers to be described. The remote protocol (RPROT) register 260 and the DATA register 262 are devoted to bits which describe the contents of the received control cells that contain messages for the remote. When a cell containing the message arrives, remote router 214 checks the validity of the CRC, interprets the header, sets the appropriate flag bit and asserts a data interrupt if a data message is received or asserts protocol interrupt if it is a protocol message. The type of interrupt directs the processor 200 to the proper flag register. If a received cell does not contain a message which requires operation by the processor and there is no return information relating to the operation of a peripheral device, the remote router asserts a frame interrupt which does not require action but does provide frame synchronization timing for the processor. The FAULT register 264 and the cell error (CEL__ERR) register 266 contain information relating to problems at the site or problems on the transmission facility.

With regard to the RPROT register 260, bits in this register have the same functions as the corresponding bits in the HPROT register 252 which was previously described with regard to FIG. 9. The order of the bits is different to reflect the difference in priorities in processing of the corresponding flag actions by the processor. The data register 262 contains bits which describe messages that have been received from the facility or have been returned from peripheral operations to the line packs, the HLSC or the relay matrix. The information provided by the flags in this register are as follows: RCV__DA corresponds to a receive data bit which is set when a message is received on the facility which requires a peripheral operation. The processor reads the receive control cell register to recover information necessary to form the upstream message when the return from the peripheral operation is available. FW__DA, is firmware data flag, is set when receive messages contain a memory read or write operation and are to be handled by the processor. RTN__DA, a return data flag, is raised when returns are received from peripheral operations. LB__ER, a line board error flag, is raised when the peripheral operation to a line board (boards which exercise common control of individual line circuits which together define the line packs) results in a parity error. LC__ER, a line circuit error flag, is raised when a peripheral operation to a line circuit results in a parity error. HS__ASW, a high level service circuit all-seems-well flag, is raised when an all-seems-well error is detected. HS__PAR, a high level service circuit parity flag, is set when a parity error is detected on a peripheral operation to the HLSC. XPT__ER, a crosspoint error flag, is set when a relay order results in a parity error.

The fault register 264 contained bits which informed the processor of problems at the site or on the transmission facility. This register is read by the processor during its base level cycle. HTS__PA, a high time slot parity flag, informs the processor that a parity error has been detected in one of the PCM time slots between time slot 16 and 31. LTS__PA, a low time slot parity error flag, informs the processor that a parity error has been detected in one of the PCM time slots between time slot 0 and 15. PLL__SL, a phase lock loop slip flag, informs the processor that a cycle slip between the reference frequency and the phase lock loop output has been detected. SIT_ALM, a site alarm flag, informs the processor that one of the alarm detectors has been asserted. SAI, a service alarm indicator flag, informs the processor that the transceiver has detected a problem with the received signal from the transmission facility. The CEL_ERR register 266 contains the CEL_CRC bit which when set, tells the processor that a received control cell contained a CRC error.

The programs which control the operation of the remote line group interface-host 112-A executed by processor 150 and the programs which control the operation of remote line group interface-remote 124-A executed by processor 200 each comprises two components, namely, a base level program operating as an endless loop and an interrupt program which executes corresponding interrupt routines. The interrupt routines are executed by interrupting operation of the base level program, completing the interrupt program, and returning to the interrupt point in the base level program. Each of the interrupt programs consist of independent routines. Each processor 150 and 200 will cycle indefinitely through each's respective base level routine. The interrupt routines are entered asynchronously via the processor interrupt mechanism.

The interrupt routines are event driven and handle real-time events. The interrupt routine for each processor includes three types of operational interrupts: DATA, PROTOCOL, and FRAME. The operational interrupts occur periodically and are synchronized with the facility frame timing. Thus, they provide a basic operational clock essential to the synchronization of program steps. The handling of interrupts are similar by each of the processors.

The base level routines for processor 150 and processor 200 operate on queues residing in the corresponding processor's RAM. For processor 150 (the host end) there are two queues, namely, a send queue and a receive queue. The send queue contains orders to be sent downstream to the remote end where the orders are executed. These orders are requested by the CC of the common shelf. The receive queue contains messages returned from the remote - either in response to an earlier order or as an indication of a fault or alarm report. These messages are to be delivered to the CC. At processor 200 (the remote end) there are three queues, namely, a receive queue, a return-data queue, and the send queue. The receive queue contains orders transmitted from the host to be executed by peripherals associated with remote line group interface 124-A or processor 200. The return-data queue contains execution results returned by the peripherals. The send queue contains messages to be transmitted upstream to the host. A message is formed by merging an order in the receive queue entry and its corresponding execution result in the return-data queue entry. A message can also be an alarm report independently detected by an alarm circuit.

Generally, entries in the described queues can be seen as jobs which need to be carded out by either processor 150 or processor 200. The interrupt routines create entries in queues and the base level routines utilize or consume entries in the queues. To maximize the high capacity performance required for the preferred embodiment of the present invention, the work load is distributed between the respective processors and the corresponding routers. Each router basically drives the corresponding processor through the interrupt mechanisms to be described, to perform various jobs. Communications between processor 150 and the CC110-A are achieved by reading and writing data in the RAM of the buffer registers 164 accessed by UART 168.

Figure 11:
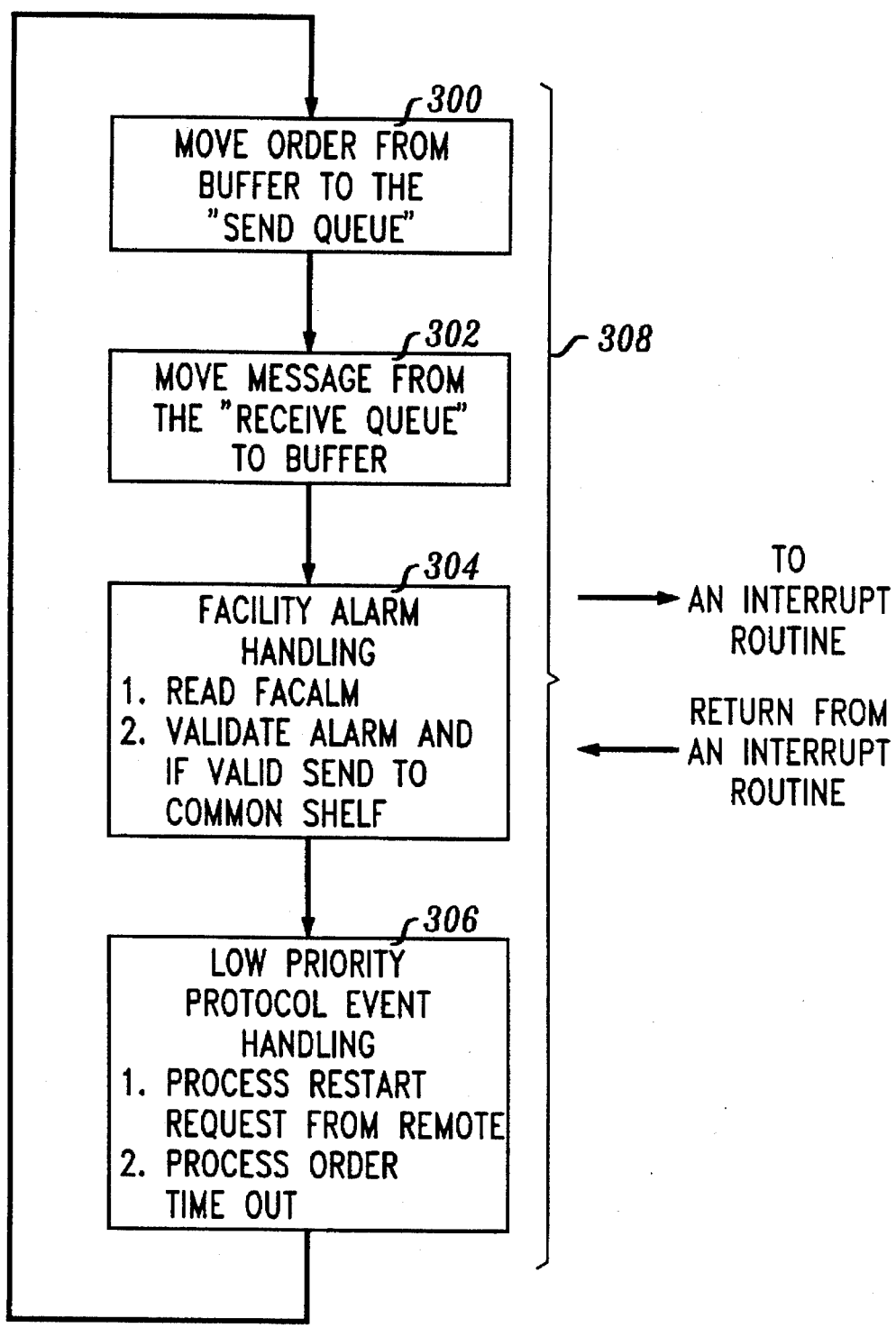
FIG. 11 is a flow diagram of a basic level cycle utilized by control computer system of the host line apparatus.

FIG. 11 illustrates a flow diagram of the base level cycle for the remote line group interface-host 112-A as executed by processor 150. Beginning in step 300 the processor 150 moves an order contained in one of the buffer registers 164 to the send queue contained in RAM 152. In step 302 the processor copies a message stored in a receive queue of RAM 152 to one of the buffer registers 164 in preparation for the buffer register 164 having the message transmitted by UART 168 to the CC via RICB. The message which was stored in the receive queue was transferred from the receive control cell register 174 in a previous operation. In step 304 facility alarm handling is accomplished. First, the FACALM register 254 in the host flag register set 176 is read to determine if either the HSAI or RSAI flags are set. If either is set, the alarm is validated such as by monitoring for a predetermined period of time to determine its validity and if valid, an alarm message is generated and transferred into one of the buffer registers 164 by processor 150 for subsequent transmission to the CC to indicate the alarm. In step 306 two independent low priority protocol events are handled. In the first event, a previously received request from the remote for a communication restart is processed. This restart request is effected by a clearing of the queues in RAM 152 to enable the restart of communications. The second process is indicative that the host has not received a return acknowledgement from the remote in response to a previously transmitted order from the host to the remote, i.e. the host encounters a "timeout" or a predetermined time. Following the completion of step 306, control returns to the beginning of step 300 thereby completing a continuous loop which is executed by the host as illustrated in FIG. 11. Bracket 308 indicates that an interrupt routine which will be described with reference to FIG. 12 can interrupt the base level cycle processing at any point to transfer execution control to a predetermined interrupt routine. Following completion of the interrupt routine, control returns from the interrupt routine back to the base level cycle from which the interrupt occurred.

Figure 12:
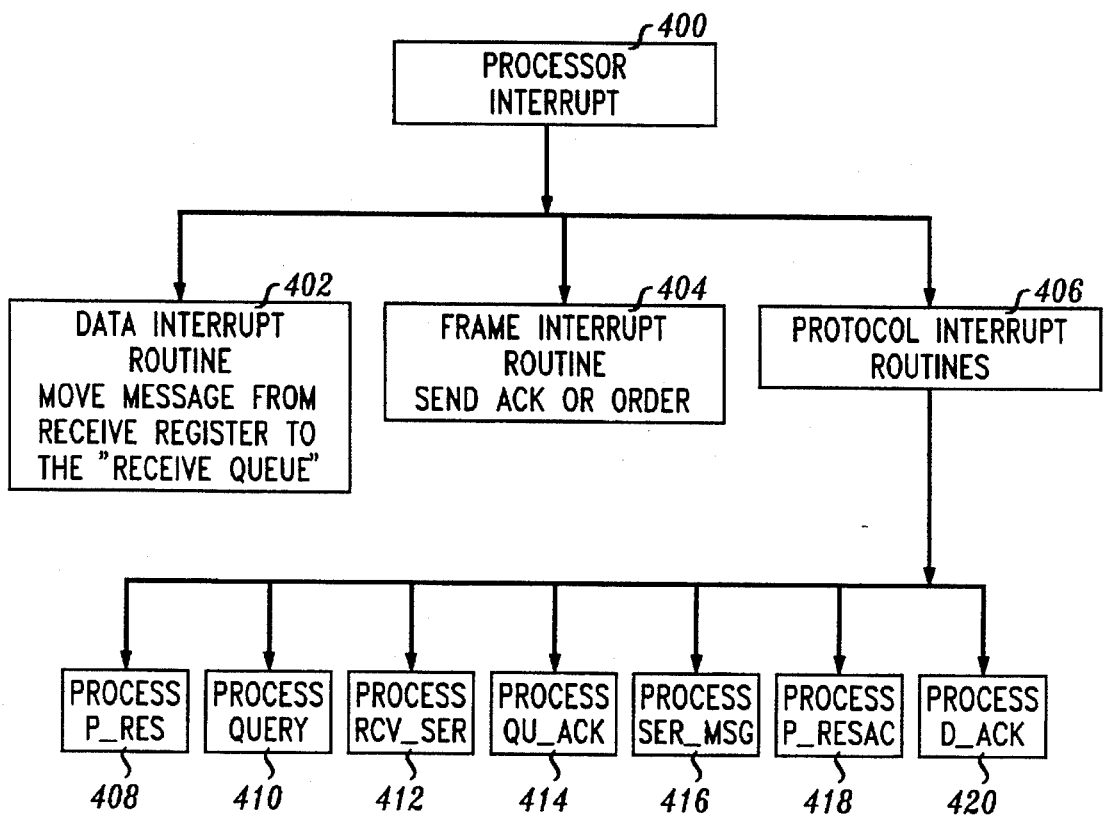
FIG. 12 illustrates a flow diagram representing interrupt routines utilized in conjunction with the steps illustrated in FIG. 11 to control the computer system associated with the host line apparatus.

FIG. 12 illustrates a flow diagram of interrupt routines utilized by the remote line group interface-host 112-A and is executed by processor 150 in conjunction with the base level cycle previously described with regard to FIG. 11. A basic processor interrupt step occurs at 400 which then causes transfer to one of three types of interrupt routines. Three general types of interrupt routines can be executed, that is, a data interrupt routine 402, a frame interrupt routine 404 or one of the protocol interrupt routines 406. Each of the interrupt routines 402, 404, and 406 are mutually exclusive, and the frame interrupt routine 404 is executed only in the absence of the execution of one of the other two types.

In the data interrupt routine 402 a message contained in the remote router receive control cell register 226 is copied to the receive queue located in RAM 152. This action is taken in preparation for the subsequent copying of the information in the receive queue to a buffer register and subsequent transmission by UART 168 to the common shelf elements.

In frame interrupt routine 404 the host can send an acknowledgement of a previously received message from the remote or an order to the remote assuming an order is ready in the queue. If an order is not ready and there is no requirement for an acknowledgement, then this routine is completed and return passes to the base level cycle.

In protocol interrupt routine 406 the HPROT register 252 in host flag registers 176 is read to determine which of the corresponding flags has been set.

In step 420 corresponding to the D_ACK flag, process 420 accounts for an acknowledgement from the remote to a previously sent order from the host and upon a positive acknowledgement from the remote of receipt of the numbered message, the host accepts the acknowledgement thereby freeing the number for reassignment.

In step 414 the QU_ACK flag is set when an acknowledgement message has been received from the remote in response to a query from the host.

In step 410 upon the QUERY flag having been set, the remote has sent a query to the host seeking the status of a previously sent message and indicates action to generate a report to the remote as to its status.

In step 416 the SER_MSG flag being set corresponds to an incorrect sequence number received associated with an order from the host and results in the remote generating a message to the host indicating the error.

Step 412 which corresponds to RCV_SER flag being set corresponds to the host having detected an incorrect sequence number associated with the just received message from the remote.

In step 408 the P_RES flag indicates a request from the remote has been received to re-initialize the communications link between the host and the remote, likely because of a communication error.

In step 418 the P_RESAC flag being set indicates the prior reception of the request associated with step 408 by the remote and is an acknowledgement sent to the host is an indication that the communication link has been re-initialized and is ready for communications.

Figure 13:
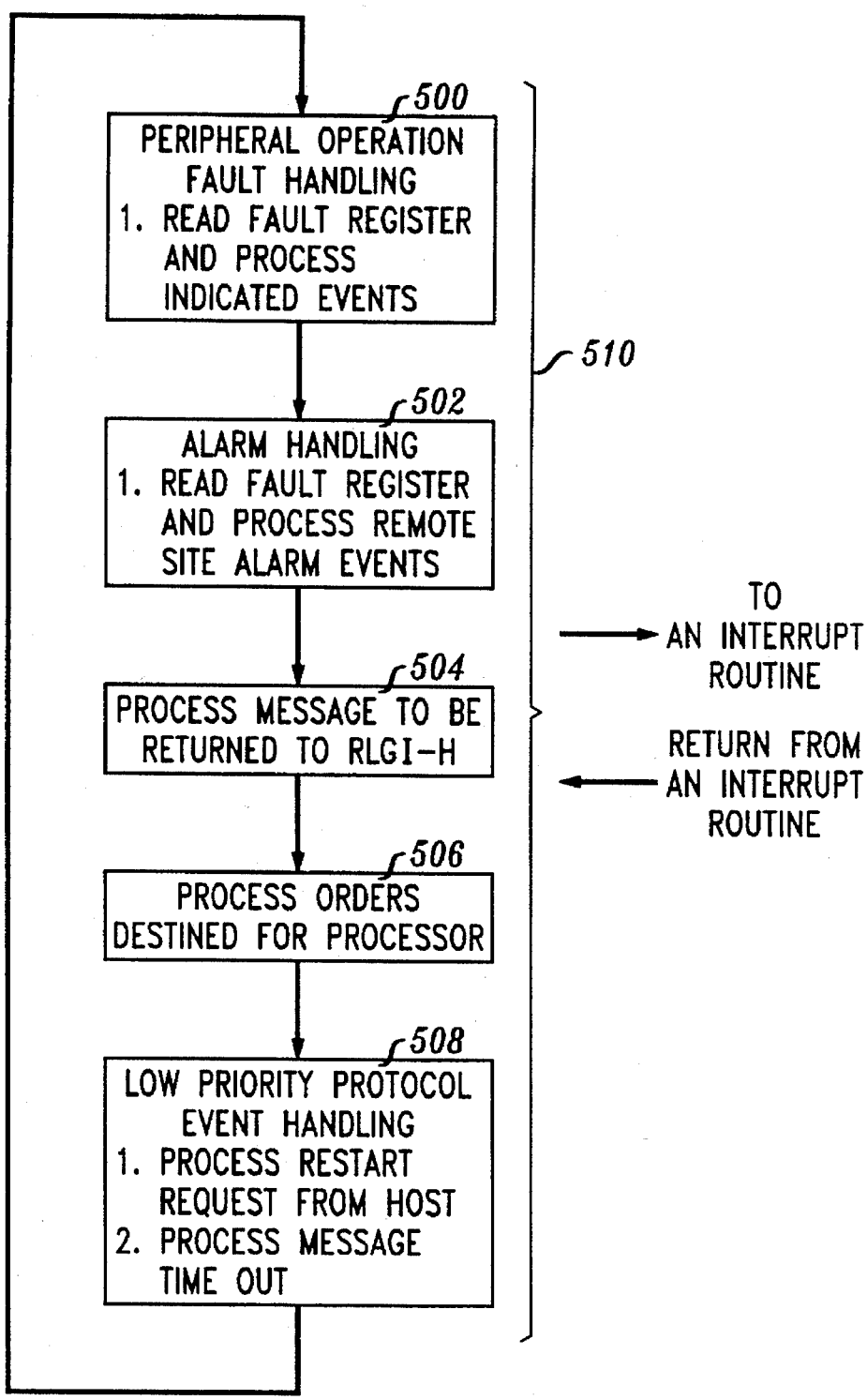
FIG. 13 is a flow diagram illustrating basic level cycle used by the control computer system of the remote line group apparatus.

FIGS. 13 and 14 are similar to FIGS. 11 and 12, respectively. FIG. 13 illustrates a flow diagram of the base level cycle utilized by remote line group interface-remote 124-A as executed by processor 200. FIG. 14 illustrates a flow diagram of interrupt routines which are event driven and interrupt the endless loop illustrated in FIG. 13.

Referring to FIG. 13 the base level cycle for the remote line group interface-remote 124-A is illustrated as executed by processor 200. In step 500, faults are handled relating to peripheral operations. The fault is identified by reading the flag set in fault register 264. If the fault is identified as HTH_PA, LTS_PA or PLL_SL, these faults are handled and processed. These events are processed by processor 200 generating a message indicative of the specific fault and putting the fault message into the send queue of RAM 202 to be sent to the host during the next frame. Step 502 deals with alarm handling and more specifically, determines if either the SIT_ALM or SAI flags are set in the fault register 264. If either is set the corresponding event is handled by processor 200 by generating a return message stored in the send queue of RAM 202 to be transmitted to the host during the next frame. In step 504 the message to be returned to the host is processed. This process includes attaching an appropriate header to the data portion of the control cell as illustrated in FIG. 8 to generate a complete message to be returned to the host. In step 506 orders destined for processor 200 are processed. This process includes reading received orders from the host which have been stored in a queue in RAM 202 which are now to be executed by processor 200. In step 508 low priority protocol events are handled. Specifically, upon receiving a restart request (P_RES) from the host, processor 200 clears all queues contained in RAM 202 in preparation for resumption of communications between host and remote. Also, this step monitors for a message timeout which occurs when the host does not send a reply acknowledgement within a predetermined time to the remote. Upon such a timeout the processor 200 of the remote generates a query to the host inquiring as to the status of the previously sent message and lack of acknowledgement. Following step 508 control of this process returns to step 500 as illustrated in the diagram thereby completing the continuously running base level cycle loop. As indicated by bracket 510 the steps illustrated in FIG. 13 can be interrupted at any point by an interrupt routine which will be described in FIG. 14. Upon an interrupt, process execution is diverted to the interrupt routine identified and control returns to the base level cycle following processing of the interrupt routine at the point of interruption.

FIG. 14 illustrates the flow diagram of interrupt routines for the remote line group interface-remote 124-A as executed by processor 200 in cooperation with the base level cycle as previously described with regard to FIG. 13. This flow begins at step 600 in which a processor interrupt is generated. One of three possible types of interrupts can be generated: order/message interrupt routine 602; frame interrupt routine 604; or protocol interrupt routine 606. Each of the possible types of data interrupt routines which comprise part of the interrupt routine 602 all relate to interrupt routines designed to handle corresponding flags set in the data register 262. Interrupt routines processing RCV_DA in step 608, FW_DA in step 610 and RTN_DA in step 612 indicate separate processes which handle the respective flags. The remaining flags indicated in process step 614 and which correspond to the remaining flags in data register 262 are all handled in the same manner as indicated by step 614. In step 608 an order received in the remote routers receive control cell register 226 is copied into a receive queue in RAM 202. In step 610, which is similar to step 608, the order contained in remote routers receive control cell register 226 is copied to a queue in RAM 202. In step 612 the order contained in the remote router's distribution register 228 is copied into a return data queue in RAM 202. In step 614 errors are processed in a similar manner. For each of the indicated errors, a message is copied into the RAM 202 return data queue and is subsequently transmitted to the host after an appropriate header is affixed.

Each of the routines 602, 604, and 606 are mutually exclusive, i.e. only one type of interrupt can happen for each frame. The frame interrupt routine 604 is generated to define the beginning of a frame only if neither of the 602 or 606 routines are initiated. The frame interrupt routine 604 can send an acknowledgement of receipt of an order back to the host or a return message to the host. If neither of these two actions are to be taken, the routine is complete and return passes to the base level cycle.

Protocol routines 606 correspond to the flag which is set in the remote flag register RPROT register 260. Each of the subprocesses under protocol interrupt routine 606 are involved with the exchange of orders from the host to the remote and the transmission of messages from the remote to the host.

In step 616 corresponding to the D_ACK flag, process 616 accounts for an acknowledgement from the host to a previously sent message from the remote and upon a positive acknowledgement from the host of receipt of the numbered message, the remote accepts the acknowledgement thereby freeing the number for reassignment.

In step 618 upon the QUERY flag having been set, the remote generates a query acknowledge message to be transmitted to the host providing status of a previously transmitted message from the host.

In step 620 the QU_ACK flag being set indicates the host has responded to a query from the remote providing the status of a previously sent order.

In step 624 the RCV_SER flag being set corresponds to an incorrect sequence number associated with an order received from the host and results in the remote generating a message to the host indicating the error.

Step 622 which corresponds to SER_MSG flag being set corresponds to the host having sent an error indication of an incorrect sequence number associated with a previously transmitted message.

In step 626 the P_RES flag indicates a request from the host has been received to re-initialize the communications link between the host and the remote, likely because of a communication error. In step 628 the P_RESAC flag being set indicates the prior reception of the request associated with step 626 by the host and is an acknowledgement sent by the host as an indication that the communication link has been re-initialized and is ready for communications.

An example follows of actions involved in causing a subscriber's telephone to ring. The switch activates the ringing by sending a ringing command to the CC. The ringing command contains information regarding the metallic loop over which an AC current will flow to drive the ringer in the telephone. The CC establishes the metallic path by closing appropriate relays in the relay matrix, in the line pack, and in the HLSC and then activates HLSC to provide the ring current. This procedure requires a number of hardware operations to be carded out in a specific sequence. The CC constructs a series of peripheral orders accordingly and sends them to the remote line group interface 124-A where they are routed to and executed by peripherals on remote line group 120. A description follows of how this task is accomplished.

First, the metallic path from the HLSC to the proper line group bus (RLGBUS) is established by sending a number of orders to the relay matrix. The CC then sends another order to the line pack to connect the subscriber loop to the RLGBUS. The CC sends another order to activate the HLSC which applies current to the loop and rings the phone. The task of initiating ringing requires a substantial number of orders. All orders are carded out in the similar fashion, a detailed description of how a single order is accomplished is given as follows.

The CC formats a relay closure order based on the information contained in the ringing command. The destination device of the order selects a relay matrix. This remote order is written to the buffer 164 in interface 112-A via the UART 168. In the interface 112-A, the processor 150 unloads the order from the buffer during the base level cycle 300 and moves the order to the "send queue" in RAM 152. On the next frame interrupt 404, the processor copies the order from the "send queue" to the transmit control cell register 172 in the host router 166 and the order is transmitted to interface 124-A over the facility 104.

At interface 124-A, the order is received by the remote router 214, and copied to the control cell register 226. The router sets the RCV-DA in the data flag register 262 and generates a data interrupt. Being interrupted, the processor 200 jumps to the data interrupt handling routine 602 which copies the order from the control cell register 226 to the "receive queue" in RAM 202. The router 214 distributes the order to the relay matrix 128-A.

Upon completion of the relay operation, the router 214, at the time when the next facility frame is recognized, sets the RTN-DA in the data flag register 262 and generates another data interrupt. The processor enters the data interrupt routine 602, copies the data in the distribution register 228 to the "return data queue" in RAM 202 and returns to the base level cycle. The base level routine 504 forms a return message from the data in the "receive queue" and the data in the "return data queue" and copies it to the "send queue" in RAM 202.

On the subsequent frame interrupt, the processor retrieves the message from the send queue and writes it to the transmit control cell register 224 in the remote router 214. The message is then sent over the facility 104.

At host 112-A, the message is received by the host router 166 and copied to the receive control cell register 174. The router sets the RCV-DA in the data flag register 250 and generates a data interrupt. The processor 150, being interrupted while cycling in the base level routines, jumps to the data interrupt routine 402 which copies the message to the receive queue in RAM 152 and returns to the base level cycle. The base level cycle routine 302 moves the message from the receive queue to the buffer 164. The CC reads the message from the buffer 164 and proceeds to the next order.

Although an embodiment of the present invention has been described and shown in the drawings, the scope of the invention is defined by the claims that follow.

We claim:

1. A host line apparatus (HLA) provides an interface between a plurality of line group apparatus (LGA) and common shelf equipment contained in a line unit in a telecommunication switching system, the LGA includes circuit boards that are coupled to individual user communication lines, the HLA receives input commands from the common shelf equipment to control call parameters of the LGA and receives user data from the common shelf equipment for distribution to individual users via the LGA, the host line apparatus characterized by:

means for storing said input commands received from the common shelf equipment and translating said input commands into corresponding order commands;

means for transmitting said order commands to said LGA which is geographically remote from said HLA and uses the received order commands to control call parameters;

means for transmitting said received user data to the LGA and for receiving other user data transmitted from the remote LGA, the host line apparatus enabling a line group apparatus to be installed at a remote location relative to the common shelf equipment so that a group of users at the remote location can be economically served.

2. The host line apparatus according to claim 1 wherein said means for transmitting said order commands and said means for transmitting said received user data transmit said order commands and user data, respectively, on a single data channel.

3. The host line apparatus according to claim 2 wherein said order commands and received user data bound for the remote LGA are transmitted as packets of information contained within a frame format.

4. The host line apparatus according to claim 3 wherein predetermined time slots in said frame format contain said order commands.

5. The host line apparatus according to claim 1 further comprising:

means for receiving messages transmitted from said LGA, said received messages specifying parameters associated with the user's communication line, and means for translating said messages into corresponding commands utilized by said common shelf equipment;

means for transmitting said commands to said common shelf equipment;

means for receiving user data transmitted by said LGA and transmitting said user data to said common shelf equipment.

6. A line group apparatus (LGA) located remote from a host line apparatus (HLA) and linked by a communication channel to the HLA, the HLA providing an interface between the LGA and common shelf equipment contained in a line unit in a telecommunication switching system, the common shelf equipment receiving messages from the HLA which define call control parameters, transmitting other user data to the HLA, and receiving user data from the HLA, the LGA having circuit boards that are coupled to individual user communication lines, the line group apparatus characterized by:

means for storing commands associated with the control of call parameters of user communication lines, the commands being sent from the circuit boards associated with the LGA;

means for transmitting said messages based on said commands to the HLA which is geographically remote from said LGA;

means for receiving said user daTA from said circuit boards and transmitting said user data to the HLA and for receiving said other user data transmitted from the HLA, the line group apparatus enabling a group of users at a location remote from the common shelf equipment to be economically served.

7. The line group apparatus according to claim 6 wherein said means for transmitting said messages and said means for transmitting user data transmit said messages and user data, respectively, on a single data channel.

8. The line group apparatus according to claim 7 wherein said messages and user data are transmitted as packets of information contained within a frame format.

9. The line group apparatus according to claim 8 wherein predetermined time slots in said frame format contain said messages.

10. The line group apparatus according to claim 6 further comprising:

means for receiving order commands transmitted by said HGA that specify call parameters associated with the user's communication line and for translating said order commands into corresponding command data utilized by said circuit boards;

means for transmitting said command data to said circuit boards;

means for transmitting said other user data to said circuit boards.

11. A method for operating a line group apparatus (LGA) located remote from common shelf equipment coupled to a host line apparatus (HLA), the method comprising the steps of:

receiving and storing input commands received by the HLA from the common shelf equipment;

said HLA translating the input commands into order commands and transmitting said order commands to said LGA;

receiving said order commands at the LGA and providing call parameter control of communication lines associated with said LGA based on the received order commands;

receiving user data transmitted from the HLA at the remote LGA, storing at the LGA controls commands associated with control of call parameters of user communication lines coupled to said LGA, the control commands being sent from circuit boards coupled to the LGA;

said LGA transmitting messages based on said control commands to the HLA which is geographically remote from said LGA; thereby enabling a line group apparatus to be installed at a remote location relative to the common shelf equipment so that a group of users at the remote location can be economically served.

12. The method of claim 11 further comprising the step of transmitting said order commands and user data from the HLA in frames over a single communication channel to the LGA.

13. The method of claim 11 further comprising the step of controlling the rate of transmission of the order commands from the HLA to the LGA to minimize call processing degradation.

* * * * *